Oct. 15, 1929.　　　I. D. BLOCK　　　1,731,648

METHOD OF PREPARING BACON SLABS

Filed Aug. 2, 1926

Isaac D. Block, Inventor

By John W. Farley

Attorney

Patented Oct. 15, 1929

1,731,648

UNITED STATES PATENT OFFICE

ISAAC D. BLOCK, OF MEMPHIS, TENNESSEE

METHOD OF PREPARING BACON SLABS

Application filed August 2, 1926. Serial No. 126,490.

The invention relates to methods of preparing bacon slabs whereby the food value of the skin is retained, and at the same time the fibrous outer surface of the skin is removed which leaves the softer under surface of the skin on the slab, and which under surface has a great deal of protein therein, and by removing the outer surface of the skin, the bacon slices when severed therefrom will lie flat in a pan and will not curl, thereby insuring a uniform cooking of the slice.

A further object is to treat a slab of bacon in a manner whereby the outer hard skin surface is removed, or the texture thereof broken up, thereby allowing the skin to remain on the slab, thereby preventing waste, and at the same time renders the skin relatively soft, palatable and the hard particles eliminated therefrom. The treating of the bacon slab may take place before or after curing.

Figure 1:
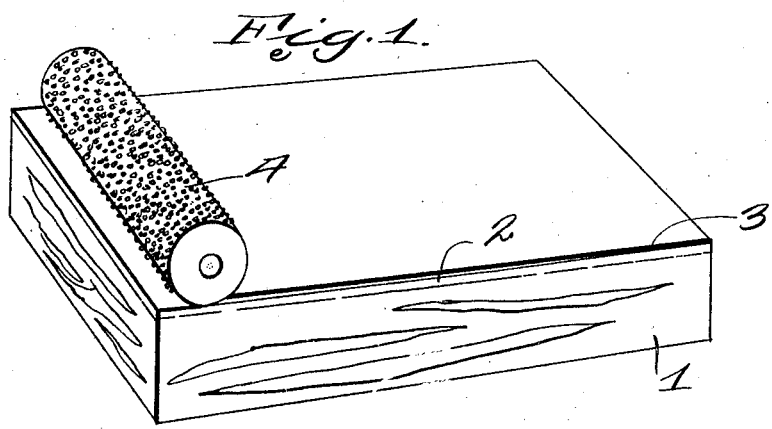
Figure 1 is a perspective view of a slab of bacon showing an abrasive roller in position thereon.
Figure 2:
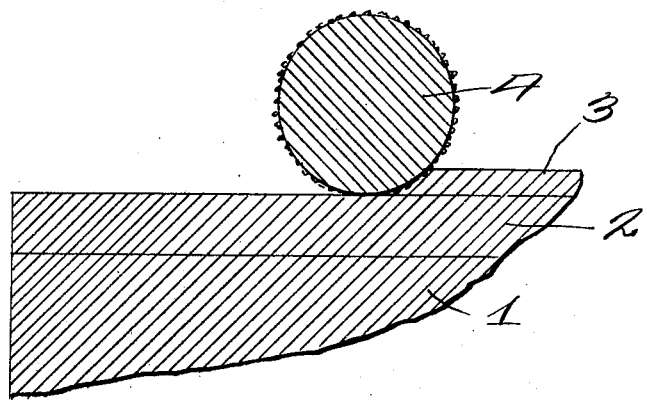
Figure 2 is an enlarged detail sectional view through one side of the slab on an enlarged scale.

Referring to the drawing, the numeral 1 designates a conventional form of slab of bacon, and 2 the skin on one side thereof. It has been found that the outer surface 3 of the skin 2 is relatively hard in relation to the under surface, consequently practice has grown of selling bacon without the skin. It will be noted where the skin is removed there is considerable loss of material, and material which is particularly rich in food value, and to obviate this difficulty the outer hard portion 3 of the skin 2 is preferably removed, and which operation leaves the soft under portion of the skin on the slab. The outer surface 3 may be removed in many ways, for instance by a rotating abrasive roller 4, which will grind the outer surface 3 from the skin. However it may be removed in other ways, for instance by a shredding or scarifying device that would break up the tough outer fiber forming the outer portion 3 of the skin, and by these last named methods part of the fiber is removed but the rest is broken up so that it relieves the roughness, but a part remains with the rind and is cooked therewith. It is obvious many different devices could be used for scarifying, shredding or grinding the outer hard surface, or a steaming device could be used for softening the skin as a whole. Also chemical means used for softening the skin if desired.

It has been found that not only is the skin rendered edible and the roughness and hardness thereof eliminated, but slices of bacon severed therefrom, by having the skin thereon soft, or the outer surface of the skin removed, the slices will lie flat in a pan while being fried, which will eliminate the curling of the slices during a cooking operation, and will insure a uniform cooking of the slices.

The invention having been set forth what is claimed as new and useful is:—

1. The method of rendering bacon skin on slabs edible, said method comprising breaking up the fiber of the hard outer surface of the skin.

2. A method of treatment of bacon comprising softening the skin before cooking to render the rind edible and to prevent curling of the slices.

3. A method of treatment of bacon, comprising softening the skin before cooking to render the rind soft and eatable by shredding the hard outer surface only of the skin.

In witness whereof, I have hereunto set my hand at Memphis, Tennessee, this 30th day of July, 1926.

ISAAC D. BLOCK.